Patented July 9, 1929.

1,720,462

UNITED STATES PATENT OFFICE.

JOHN WILLIAM BLAGDEN, OF LONDON, ENGLAND, ASSIGNOR OF ONE-HALF TO HOWARDS & SONS LIMITED, OF ILFORD, ENGLAND.

MANUFACTURE OF HYDROGENATED ALKALOIDS.

No Drawing. Application filed March 20, 1926, Serial No. 96,319, and in Great Britain March 24, 1925.

In presence of a colloidal metal of the platinum group and in acid solution, the cinchona alkaloids can be hydrogenated at 40°–45° C. by hydrogen to produce hexahydro-derivatives, but so far as has been known hitherto, in the presence of a nickel or nickel suboxide catalyst, the hydrogenation does not proceed beyond the dihydro-derivatives. Hence the more costly platinum catalyst has appeared to be necessary for producing the higher hydro-derivatives.

By the present invention a cinchona alkaloid, such as quinine or cinchonidine, or a substitution derivative thereof, can be hydrogenated to form the hexahydro-derivative by the action of hydrogen in presence of a nickel catalyst or another catalyst of the nickel group (which includes nickel, iron, cobalt and copper) at a raised temperature. Besides the economy of working as compared with the known process, there is the advantage that is not necessary to operate in an acid solution. The additional hydrogenation is not appreciable at temperatures below 30° C. but above this temperature, and preferably at 60°–80° C., the absorption of hydrogen occurs readily and continues until the hexahydroderivative has been formed.

In British specifications Nos. 21,883 of 1914 and 21,948 of 1914 the hydrogenations of quinine to hydro-quinine in aqueous or alcoholic solution in presence of nickel suboxide, is described and it is stated that the hydrogenation can occur at ordinary temperature and pressure or slightly raised pressure and that the temperature and pressure can be varied within wide limits. In the examples, however, the temperature used is about 30° C. and the product obtained is dihydroquinine. In fact, at the date of the said specifications hexahydroquinine was not known, and its production by the process of the said specifications cannot occur at ordinary temperature.

As parent material for the invention the nonhydrogenated alkaloid or substitution product may be used, in which case the hydrogenation may be conducted at a raised temperature from the first, or it may be conducted first at ordinary temperature and then at a raised temperature.

Alternatively, the parent material may be the dihydro-derivative of the alkaloid or substitution product, the hydrogenation being conducted at a raised temperature from the first.

The parent material may be used in the form of a base or a salt and may be dissolved in water, alcohol or other suitable solvent.

The following examples illustrate the invention, the parts being by weight:—

*Example 1.*—5 parts of quinine base are dissolved in 100 parts of absolute alcohol and the solution is agitated at 20° C. with 3 to 4 parts of a nickel catalyst in an atmosphere of hydrogen under pressure of 20 to 40 lbs. per square inch. The gas is readily absorbed until the quantity representing the production of dihydro-quinine has been taken up, when it ceases. The temperature is now raised to above 40° C. whereupon gas absorption sets in again at a slower rate than before; the temperature is raised slowly until double the amount of gas has been absorbed as was absorbed in the first stage, by which time the final temperature may be about 80° C. The hexahydroquinine produced is isolated by evaporating the filtered solution.

*Example 2.*—5 parts of quinine base are dissolved in 150 parts of alcohol of 30 per cent strength and the solution is treated with catalysts and hydrogen as is described in Example 1.

*Example 3.*—10 parts of quinine hydrochloride are dissolved in 150 parts of water and the solution is agitated in a hydrogen atmosphere at a pressure of about 40 lbs. per square inch with 3 or 4 parts of a nickel catalyst. The initial temperature of 20° C. is raised gradually to about 75° C. When absorption of hydrogen has ceased the hexahydroquinine base is isolated from the solution in known manner.

*Example 4.*—25 parts of dihydroquinine base are dissolved in 120 parts of adsolute alcohol and the solution is agitated with 8 to 10 parts of a nickel catalyst at a temperature of 70° C. in an atmosphere of hydrogen under a pressure of about 40 lbs. per square inch. After absorption has ceased the solution is filtered and the hexahydroquinine obtained by evaporation of the solvent.

*Example 5.*—10 parts of cinchonidine hydrochloride are dissolved in 150 parts of water and the solution is agitated with 4 to 5 parts of a nickel catalyst in a hydrogen atmosphere under a pressure of about 40 lbs.

per square inch. The hydrogen corresponding with the production of the dihydro-body is absorbed at a temperature of 20° C. When this absorption has ceased the temperature is raised above 40° C. and a fresh gas absorption occurs and continues until the hexahydro-cinchonidine is formed, the final temperature of the catalyst being about 70° C. The new base is isolated from the aqueous solution in known manner.

The nickel catalyst used in the foregoing examples may be prepared by reducing commercial nickel carbonate in hydrogen at a low temperature, which may conveniently be 260° C.

Having thus fully described the nature of the said invention and the best means I know of carrying the same into practical effect, I claim:—

1. A process for the manufacture of hydrogenated cinchona alkaloids, which process consists in subjecting material selected from the group consisting of the cinchona alkaloids, their dihydro derivatives, and salts of the said alkaloids and dihydro derivatives in presence of a solvent for the material and of a catalyst of the nickel group to the action of hydrogen at a temperature which at least in the later stages of the reaction is not less than 40° C.

2. A process for the manufacture of hydrogenated cinchona alkaloids, which process consists in causing material selected from the group consisting of the cinchona alkaloids, their dihydro derivatives, and salts of the said alkaloids and dihydro derivatives to absorb hydrogen in presence of a catalyst of the nickel group at a temperature above 30° C. until the quantity of hydrogen absorbed corresponds with the formation of a hexahydro-derivative of the alkaloid.

3. A process for the manufacture of hexahydroquinine, which process consists in subjecting material selected from the group consisting of quinine, dihydro-quinine and salts of both these bodies in presence of a solvent for the material and a catalyst of the nickel group to the action of hydrogen at a temperature which at least in the later stages of the reaction is not less than 40° C.

4. A process for the manufacture of hexahydroquinine, which process consists in causing material selected from the group consisting of quinine, dihydroquinine and salts of both these bodies to absorb hydrogen in presence of a catalyst of the nickel group at a temperature above 30° C. until the quantity of hydrogen absorbed corresponds with the formation of hexahydroquinine.

5. A process for the manufacture of hydrogenated cinchona alkaloids, which process consists in causing material selected from the group consisting of the cinchona alkaloids, their dihydro derivatives, and salts of the said alkaloids and dihydro derivatives to absorb hydrogen in presence of a catalyst of the nickel group at a temperature above 30° C. until the quantity of hydrogen absorbed corresponds with the conversion of at least a substantial portion of the parent material into a hexahydro-derivative of the alkaloid.

6. A process for the manufacture of hexahydroquinine, which process consists in causing material selected from the group consisting of quinine, dihydroquinine and salts of both of these bodies to absorb hydrogen in presence of a catalyst of the nickel group at a temperature above 30° C. until the quantity of hydrogen absorbed corresponds with the conversion of at least a substantial portion of the parent material into hexahydroquinine.

In testimony whereof I have signed my name to this specification.

JOHN WILLIAM BLAGDEN.